(No Model.)
T. E. LEWIS.
SLEIGH RUNNER.
No. 395,398. Patented Jan. 1, 1889.
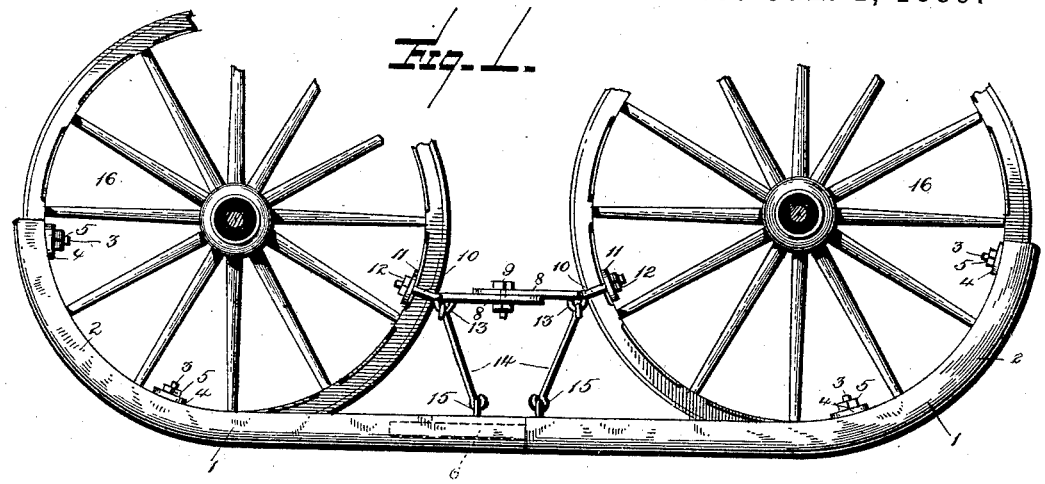
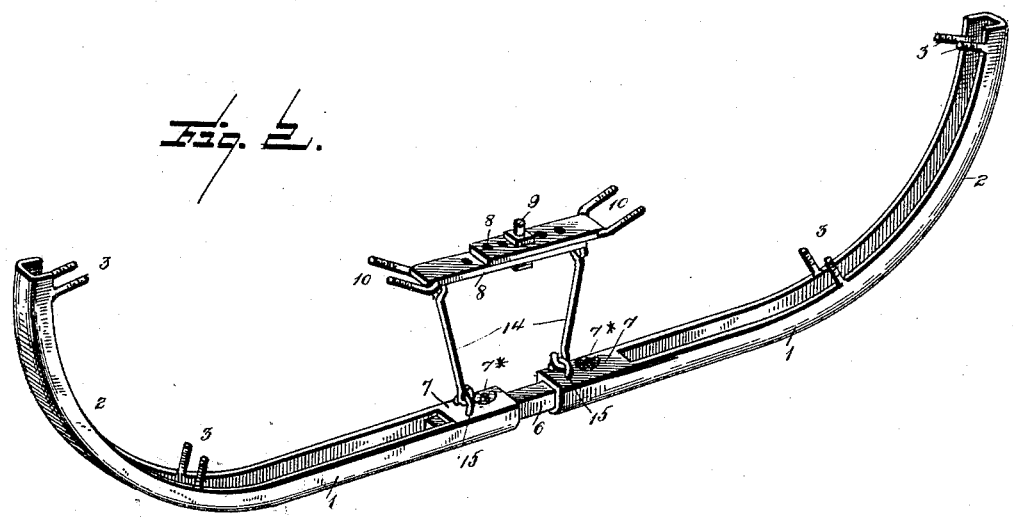
Witnesses:
L. C. Hills
W. S. Duvall
Inventor
Thomas E. Lewis
E. B. Stocking
Attorney
N. PETERS, Photo-Lithographer, Washington, D. C.

UNITED STATES PATENT OFFICE.

THOMAS E. LEWIS, OF DUBLIN, TEXAS.

SLEIGH-RUNNER.

SPECIFICATION forming part of Letters Patent No. 395,398, dated January 1, 1889.

Application filed July 5, 1888. Serial No. 279,070. (No model.)

*To all whom it may concern:*

Be it known that I, THOMAS E. LEWIS, a citizen of the United States, residing at Dublin, in the county of Erath, State of Texas, have invented certain new and useful Improvements in Sleigh-Runners, of which the following is a specification, reference being had therein to the accompanying drawings.

This invention has relation to runners for vehicles, whereby the same are adapted for traveling in snow.

Among the objects in view are to provide an inexpensive serviceable runner which is adjustable to fit wheels of varying distances apart, which is light and durable, and which can be easily and quickly applied to the wheels or removed therefrom and packed under a seat of a vehicle or other convenient place, and thus carried about for use in snow-storms, or removed from the wheels should the snow disappear during a journey.

Other objects and advantages of the invention will hereinafter appear, and the novel features thereof will be particularly pointed out in the claims.

Referring to the drawings, Figure 1 represents a side elevation of a pair of wheels, each provided with a runner constructed in accordance with my invention; and Fig. 2 represents two runner-sections in perspective operatively connected.

Like numerals indicate like parts in both of the figures.

In practicing my invention I provide a section, 1, for each wheel of the vehicle and form the same of U-shaped metal, or, if desired, it may be of tubing having a longitudinal section removed, so that the runner is adapted for embracing the rim of the wheel 16. Each of the runner-sections 1 is curved at its outer end, as at 2, to partake of the circular contour of the wheel, and is provided at certain distances apart with screw-threaded lugs 3, which project from the edges of the sections inwardly and beyond the inner periphery of the rim of the wheel 16. These lugs 3 are arranged opposite each other, and may or may not be formed as a part of the runner-section. When in position upon a wheel, as shown in Fig. 1, the sections are secured to the rim of the same by perforated plates or links 4—one for each pair of lugs—and which take over the lugs and bind the runners to the rim through the medium of nuts 5. The sections are made somewhat shorter than the distance between the wheels, so that when mounted in position there is usually left a space between the inner ends of said sections. For this purpose, and for the purpose of making them adjustable and keeping them in line with each other, a tenon, 6, is provided, which may be either independent of the two sections and held by set-screws 7* or formed upon one and adapted to take into the other of said sections, the sections being closed at their inner upper faces, as at 7, for the reception of the tenon. By this construction the runners are made continuous and are prevented from getting out of alignment with each other.

For the purpose of locking the wheels against movement and keeping them in a line with each other, and also for the purpose of an additional central brace for the runner-sections, I provide an adjustable lock to be applied to each pair of wheels, and the same consists of two overlapping perforated adjustable plates, 8, which are held in an adjusted position with relation to each other by the set-bolt 9. From the outer ends of each of these plates there project staples 10 for embracing the rim, the ends of which are screw-threaded and connected by perforated plates 11, which are held in position by nuts 12. Depending from eyes 13, formed on the under side of each of the plates, are loosely-connected hook-arms 14, the lower ends of which take into eyes 15, formed on the closed inner ends, 7, of each of the runner-sections. By this arrangement it is apparent that by adjusting the plates 8 the runner, as a whole, is adapted for use in connection with vehicles the wheels of which are different distances apart, and that, as is often the case, should a person find the snow leaving him, by simply loosening the adjusting-screw 9 and separating the adjustable coupling-plates and removing the nuts 5 and plates 4, the runners may be removed from the wheels and closely packed under a buggy-seat or other available space.

Having described my invention, what I claim is—

1. A sleigh-runner formed of two adjustable sections adapted to embrace the rim of a wheel, one of said sections being provided with a tenon adapted to enter the opposite section, substantially as specified.

2. A sleigh-runner comprising two sections adapted to embrace the rim of a wheel, in combination with an intermediate tenon for entering each of said sections, substantially as specified.

3. The combination, with the wheels of a vehicle, of two runner-sections provided with an intermediate tenon entering each of said sections and of an intermediate coupling device for locking the wheels against movement.

4. The combination, with the wheels of a vehicle, of a runner-section for each of U shape and adapted to embrace the rims of said wheels, an intermediate tenon entering each of the sections, and a coupling device connected to the sections and to the wheels and comprising two overlapping plates, substantially as specified.

5. The sections 1, curved, as at 2, and provided with the oppositely-located lugs 3, in combination with the tenon 6, wheels 16, plates 4, and nuts 5, substantially as specified.

6. The combination, with the wheels 16 and the runner-sections 1, constructed as described, of the overlapping plates 8, staples 10, plates 11, nuts 12, the adjusting-bolt 9, and the hook-arms 14, substantially as specified.

In testimony whereof I affix my signature in presence of two witnesses.

THOMAS E. LEWIS.

Witnesses:
J. J. McLemore,
I. H. Humble.